(12) United States Patent
Hishon et al.

(10) Patent No.: US 8,684,440 B2
(45) Date of Patent: Apr. 1, 2014

(54) STOWABLE VEHICLE CONSOLE PANEL

(75) Inventors: Michael K. Hishon, New Baltimore, MI (US); Brian S. Kikta, Columbiaville, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/482,199

(22) Filed: May 29, 2012

(65) Prior Publication Data

US 2013/0320689 A1 Dec. 5, 2013

(51) Int. Cl.
*B60N 3/12* (2006.01)

(52) U.S. Cl.
USPC ........................................ 296/37.8; 296/24.34

(58) Field of Classification Search
USPC ............. 296/24.34, 37.8, 220, 264, 348, 813; 220/264, 348, 813
See application file for complete search history.

(56) References Cited

U.S. PATENT DOCUMENTS 7,125,063 B2 * 10/2006 Kawamoto et al. .......... 296/37.8

* cited by examiner

*Primary Examiner* — Joseph Pape
*Assistant Examiner* — Dana Ivey
(74) *Attorney, Agent, or Firm* — Reising Ethington P.C.

(57) ABSTRACT

A vehicle console includes a panel that has a closed position and a stowed position. The panel at least partly covers a utility area when in the closed position, and an end of the panel is concealed from view in the stowed position. The panel pivots about a pivot point and is coupled with a movement mechanism. The movement mechanism includes one or more gears and a pivot arm with dimensional relationships that define a line of movement for the pivot arm as it moves between the closed and stowed positions. A planetary gear set may be used to define a curvilinear path, such as an elliptical path, or a rectilinear path for the pivot point.

17 Claims, 4 Drawing Sheets

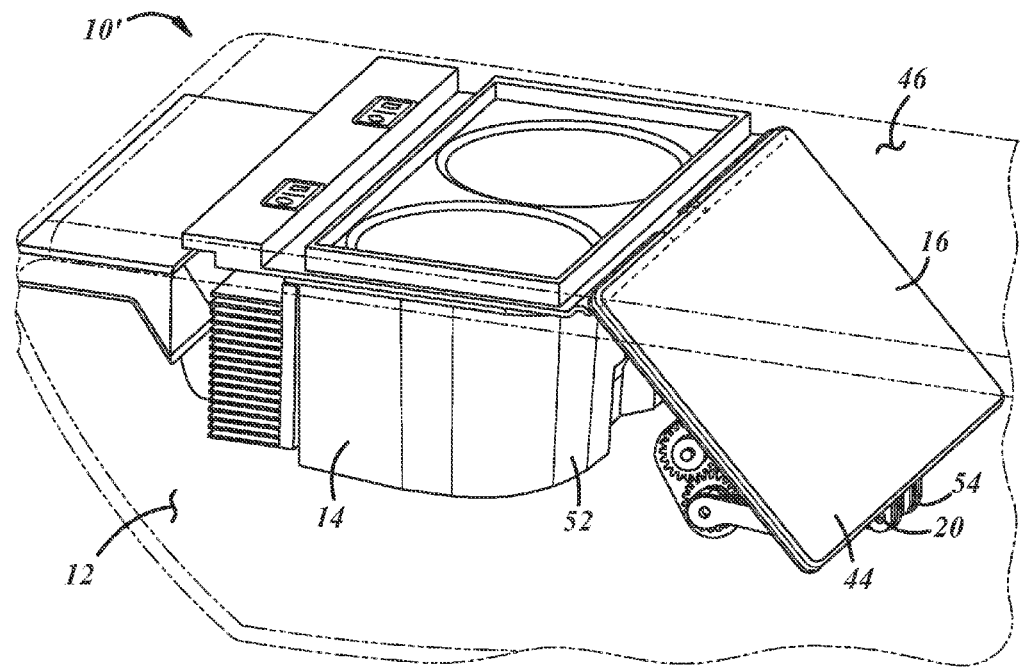
FIG. 7
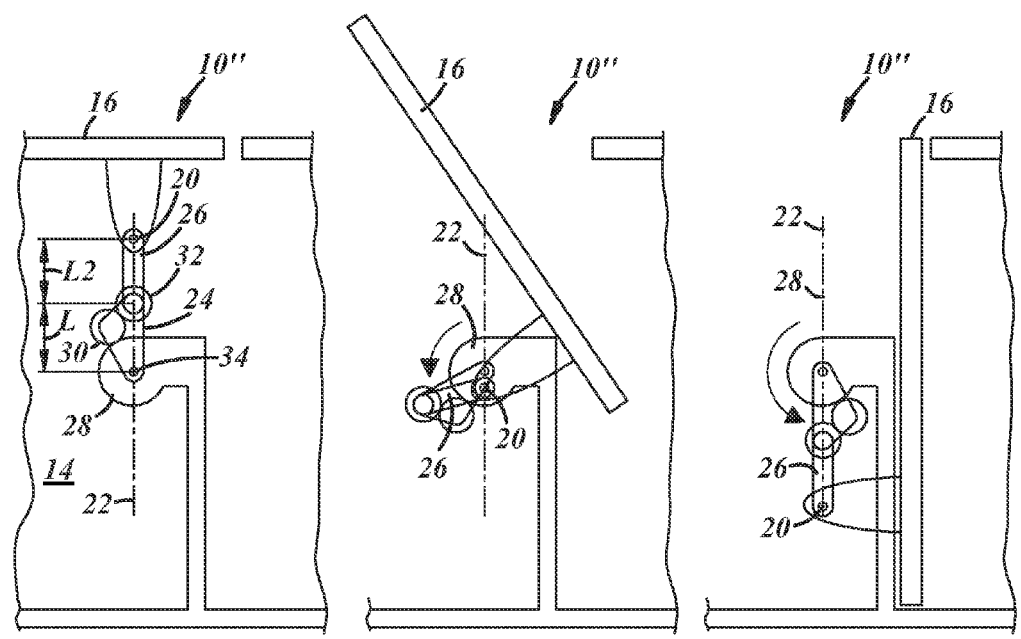
FIG. 8  FIG. 9  FIG. 10

US 8,684,440 B2

STOWABLE VEHICLE CONSOLE PANEL

TECHNICAL FIELD

The present disclosure relates to vehicle consoles and, more specifically, to movable vehicle console panels.

BACKGROUND

Vehicle consoles are typically multi-functional assemblies and are often located between the driver and passenger sides of a vehicle interior. Such consoles may include one or more storage areas, cup holders, accommodations for shift or brake levers, power outlets, coin holders, lighting, ashtrays, armrests, hinged or sliding doors, etc. Consoles may be arranged between separate bucket-style seats, in front of bench-style seats, or may fold out of or away from a seat back or some other vehicle component. Some consoles extend from a location forward of the front seats of a vehicle to a location rearward of the front seats of the vehicle so that occupants in all areas of the vehicle can access and use its features. Certain components of a console assembly may be adjustable or movable for more convenient use by the vehicle occupants.

For example, Japanese patent application publication number JP 10-297338 by Hideki et al. discloses a vehicle console with a cup holder. The console includes a movable lid that moves from a generally horizontal position to a generally vertical position by pivoting about an axis that passes through the cup holder area. The lid conceals the cup holder when in the horizontal position and reveals the cup holder when in the vertical position. A shape built into the underside of the lid conforms to the shape of a cup, so that the lid becomes a functional part of the cup holder when in the vertical position. A spring biases the lid toward respective open and closed positions when the lid is in each respective position.

SUMMARY

In accordance with one embodiment, there is provided a vehicle console, including a base, a utility area supported by the base, a panel being movable to provide access to the utility area and being rotatable about a pivot point, and a movement mechanism that defines a line of movement for the pivot point. The movement mechanism includes a planetary gear set and a pivot arm that couples the panel with the planetary gear set at the pivot point.

In one embodiment, the planetary gear set includes a sun gear, a first planet gear in operational contact with the sun gear, and a second planet gear in operational contact with the first planet gear.

In another embodiment, the distance between the center of the sun gear and the center of the second planet gear is the same as the effective diameter of the sun gear.

In another embodiment, the planetary gear set includes a sun gear and a planet gear, and the effective diameter of the planet gear is one half the effective diameter of the sun gear.

In another embodiment, the planetary gear set includes a sun gear and a planet gear, the pivot arm is pivotally attached to the panel at the pivot point, and the pivot arm is attached to the planetary gear set so that the pivot arm rotates together with the planet gear about the center of the planet gear.

In another embodiment, the distance between the pivot point and the center of the planet gear is greater than or equal to the effective diameter of the sun gear.

In another embodiment, the line of movement is curvilinear.

In another embodiment, the line of movement is along an elliptical shape.

In another embodiment, line of movement is rectilinear.

In accordance with another embodiment, there is provided a vehicle console, including a base, a utility area supported by the base, a panel that is movable from a closed position to a stowed position to provide access to the utility area, and a movement mechanism including one or more gears and being pivotally coupled with the panel at a pivot point. The panel rotates about the pivot point and the pivot point moves in a downward direction when the panel is moved from the closed position to the stowed position.

In another embodiment, the movement mechanism includes a planetary gear set and a pivot arm that couples the panel with the planetary gear set.

In another embodiment, the panel includes an end that is visible when the panel is in the closed position and said end moves beneath a portion of the vehicle console when the panel is moved to the stowed position.

In another embodiment, the pivot point moves along a curvilinear path.

In another embodiment, the movement mechanism includes a sun gear, a first planet gear in operational contact with the sun gear, a second planet gear in operational contact with the first planet gear, a carrier that fixes the distances between respective centers of said gears, and a pivot arm pivotally attached to the panel at the pivot point at one end and attached at the center of the second planet gear at another end. The effective diameter of the first planet gear is one half the effective diameter of the sun gear, the effective diameter of the second planet gear is one half the effective diameter of the sun gear, and the distance between the center of the sun gear and the center of the second planet gear is the same as the effective diameter of the sun gear. The pivot arm rotates together with the second planet gear about the center of the second planet gear.

In another embodiment, the distance between the pivot point and the center of the second planet gear is greater than or equal to the effective diameter of the sun gear.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein:

FIG. 7 is the perspective view of FIG. 5, showing the panel in the stowed position;

FIG. 8 is a schematic side view of a portion of another embodiment of a vehicle console, showing a panel in a closed position and a movement mechanism coupled with the panel at a pivot point;

FIG. 9 is the side view of FIG. 8, showing the panel moved away from the closed position and rotated about the pivot point with respect to FIG. 8; and FIG. 10 is the side view of FIG. 8, showing the panel in a stowed position.

DETAILED DESCRIPTION OF THE PREFERRED EMBODIMENT(S)

As will be apparent from the following disclosure, a vehicle console can be constructed with a movable panel that provides access to a utility area of the console. The console may be constructed so that the movable panel can rotate about a pivot point, and the panel may be coupled with a movement mechanism configured so that the pivot point moves along a desired path when the panel is moved between a closed position and a stowed position. The movement mechanism can include one or more gears to allow smooth movement of the pivot point along the desired path without the need for sliding components along the path. The pivot point can move along a path of any line of movement, such as a rectilinear path or a curvilinear path. Rotation of the panel about the pivot point and the location of the pivot point along the desired path are not necessarily dependent on one another.

Figure 1:
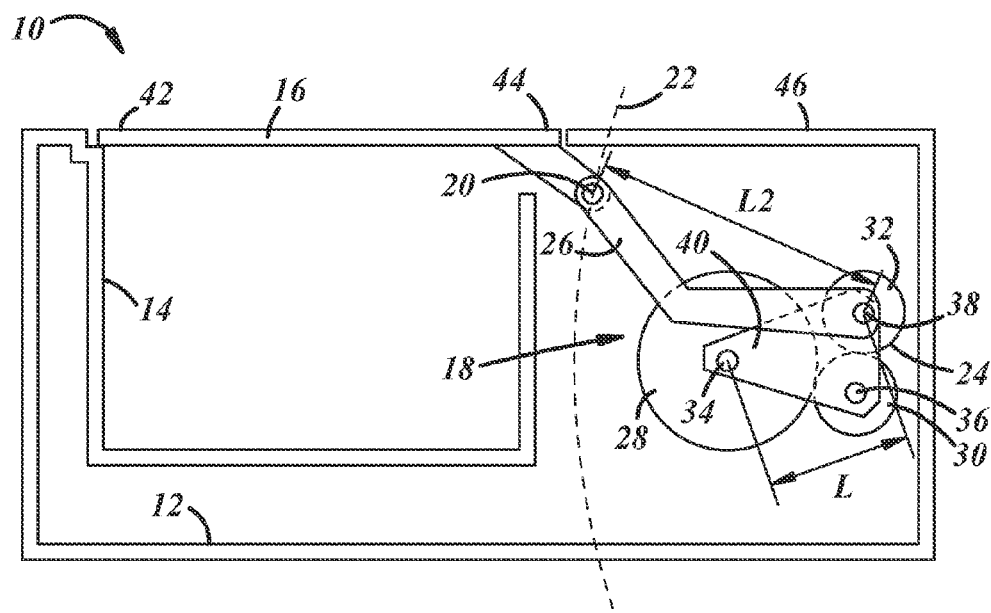
FIG. 1 is a schematic side view of one embodiment of a vehicle console, showing a panel in a closed position and a movement mechanism coupled with the panel at a pivot point.

Referring to FIG. 1, a schematic side view of a vehicle console 10 is shown, according to one embodiment. The illustrated console 10 includes a base 12, a utility area 14 supported by the base, a panel 16 shown in a closed position, and a movement mechanism 18 coupled with the panel at a pivot point 20. The base 12 is any structure that supports the utility area 14. In the case of a vehicle console, the base 12 may be attached to the floor or some other part of a vehicle body. As used here, the utility area 14 is any part of the console 10 that includes some useful feature. The utility area 14 can include a storage area, electrical outlets, USB ports, cup holders, or any of the aforementioned features often found in vehicle consoles, to name several examples. At least part of the utility area 14 can be made integral with the base 12 as shown in the schematic of FIG. 1, or the utility area can be provided at least in part by other components attached to the base 12, such as a cup holder module, a tray, etc. The utility area 14 is not necessarily a relatively large portion of the vehicle console 10 as shown in FIG. 1 and may simply be a relatively small and/or flat area that includes indicator lights, plugs, display screens or any other useful feature.

The panel 16 is positioned over the utility area 14 when in the closed position, as shown, though there may of course be other utility areas not covered by the panel. The panel 16 is movable to provide access to the utility area 14. For example, the panel 16 may be moved so that a vehicle occupant can use a cup holder that is concealed by the panel when closed. The panel 16 can be movable in more than one manner to provide access to the utility area 14. For example, the panel 16 may rotate about the pivot point 20 so that a portion of the panel away from the pivot point can swing away from the utility area 14. The panel 16 may also be movable between the closed position and a stowed position. The stowed position is a position in which the panel 16 is generally out of the way so that the vehicle passenger can use the utility area 14. The stowed position may be a fixed position where the panel remains until the passenger wishes to again conceal the utility area. Some examples of stowed positions are described below in conjunction with the figures.

The movement mechanism 18 is a mechanism configured to at least partly define the movement of the panel 16 during movement from the closed position to the stowed position, and vice versa. In this example, the movement mechanism 18 is arranged to confine the movement of pivot point 20 along a path or line of movement 22 when the panel 16 is so moved. The particular line of movement 22 depicted in FIG. 1 is a curvilinear line of movement, but may also include or be a rectilinear line of movement. The illustrated line of movement 22 is in the shape of a partial ellipse and may be referred to as an elliptical path. The line of movement 22 may also line along a straight line (rectilinear), an arcuate or circular shape, a parabolic shape, or a multi-lobe shape such as a cloverleaf shape, to name a few examples. The movement mechanism 18 is configured so that some portion of the mechanism moves along the desired path 22 during operation. In this example, that portion is located at the pivot point 20, where the mechanism 18 is coupled with the panel 16.

The movement mechanism 18 can be configured in various ways to achieve movement of the pivot point 20 along the desired path 22. In the example of FIG. 1, the mechanism 18 includes a gear set 24 and a pivot arm 26 that couples the gear set with the panel 16 at the pivot point 20. The individual gears of the gear set 24 are shown schematically and are understood to each include gear teeth spaced along their respective perimeters at a common pitch with adjacent gears with which they are in operational contact. Each individual gear of gear set 24 also has an effective diameter that is not necessarily the actual diameter of the gear. Rather, the effective diameter is the diameter used to calculate gear ratios among different gears and lies somewhere radially between the peaks and valleys of the gear teeth. As used here, the term "gear" also refers to gear portions or segments with only a portion of a full gear perimeter. The gears can be traditional spur gears, helical gears, bevel gears, or any other type.

The illustrated gear set 24 is a planetary gear set, but the mechanism 18 can include any arrangement of one or more gears. A planetary gear set is any set of two or more intermeshed gears in which the center of one gear rotates about the center of another gear. The planetary gear set 24 shown in FIG. 1 includes a sun gear 28 and first and second planet gears 30, 32 with respective centers 34-38. The locations of gear centers 34-38 with respect to one another are constant and determined by where each is fixed to a carrier 40. In this case, the location of the center 34 of the sun gear 28 is fixed relative to the base 12, and the centers 36, 38 of the planet gears 30, 32 rotate about the center of the sun gear. In this particular example, the first planet gear 30 is in operational contact with the sun gear 28, meaning that the teeth of the gears mesh with each other so that rotation of one gear about its own center causes some other form of gear movement. In this embodiment, the sun gear 28 is fixed so that it cannot rotate, and rotation of the planet gear 30 results in rotation of the center 36 of the first planet gear 30 about the center 34 of the sun gear 28. The second planet gear 32 is in operational contact with the first planet gear 30 but is not in operational contact with the sun gear 28. The center 38 of the second planet gear 32 is located a distance L from the center 34 of the sun gear.

The pivot arm 26 is attached to the gear set 24 so that it rotates together with the second planet gear 32 about the center 38 of the second planet gear. In other words, the angular positions of the pivot arm 26 and the second planet gear 32 about the center 38 do not change relative to each other. The pivot arm 26 has an effective length L2, which is distance from the center 38 of the second planet gear 32 to the pivot point 20, where the pivot arm is pivotally attached to the panel 16. The illustrated pivot arm 26 includes a bend or elbow along its length, but can be straight or any other shape depending on the location of the mechanism 18 or other considerations. Here, the effective length L2 is measured between opposite ends of the pivot arm 26, but the effective length and the actual length of the pivot arm are not necessarily the same—i.e., the actual length may be longer, the pivot arm may have other portions extending in directions away from the L2 endpoints, etc. In one embodiment, the distance L2 between the pivot point 20 and the center 38 of the second planet gear 32 is greater than or equal to the effective diameter of the sun gear 28. In the illustrated embodiment, the distance L2 is greater than the effective diameter of the sun gear 28. This effective length L2 of the pivot arm 26, along with other dimensional relationships within the movement mechanism 18, can help determine the shape of the line of movement 22.

Other dimensional relationships that can affect the shape of the line of movement 22 include the relative effective diameters of the gears 28-32 of the gear set 24, the relative distances between gear centers 34-38, and relationships between gear effective diameters and distances L and L2, to name a few. In one embodiment, the effective diameter of at least one of the planet gears 30, 32 is one half the effective diameter of the sun gear 28. In the illustrated embodiment, both of the planet gears 30, 32 have the same effective diameter. In yet another embodiment, also illustrated in FIG. 1, both of the planet gears 30, 32 have effective diameters equal to one half the effective diameter of the sun gear 28. In another embodiment, the distance L between the center 34 of the sun gear 28 and the center 38 of the second planet gear 32 is the same as the effective diameter of the sun gear 28. In the particular example shown in FIG. 1, an elliptical line of movement 22 is obtained by setting the effective diameters of the planet gears 30, 32 equal to one half the effective diameter of the sun gear 28, setting the distance L equal to the effective diameter of the sun gear, and setting the distance L2 greater than the effective diameter of the sun gear. These are non-limiting dimensional relationships, as elliptical or other curvilinear or rectilinear paths may be obtained with other diameter and/or distance relationships.

Figure 2:
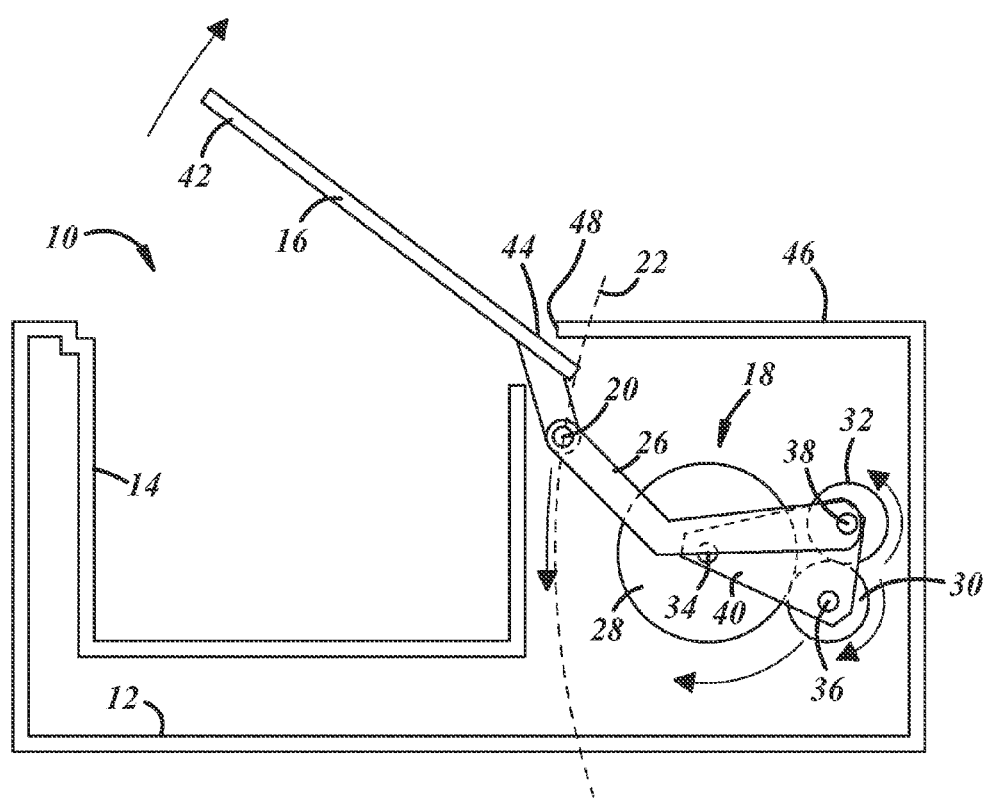
FIG. 2 is the side view of FIG. 1, showing the panel moved away from the closed position and rotated about the pivot point with respect to FIG. 1.
Figure 3:
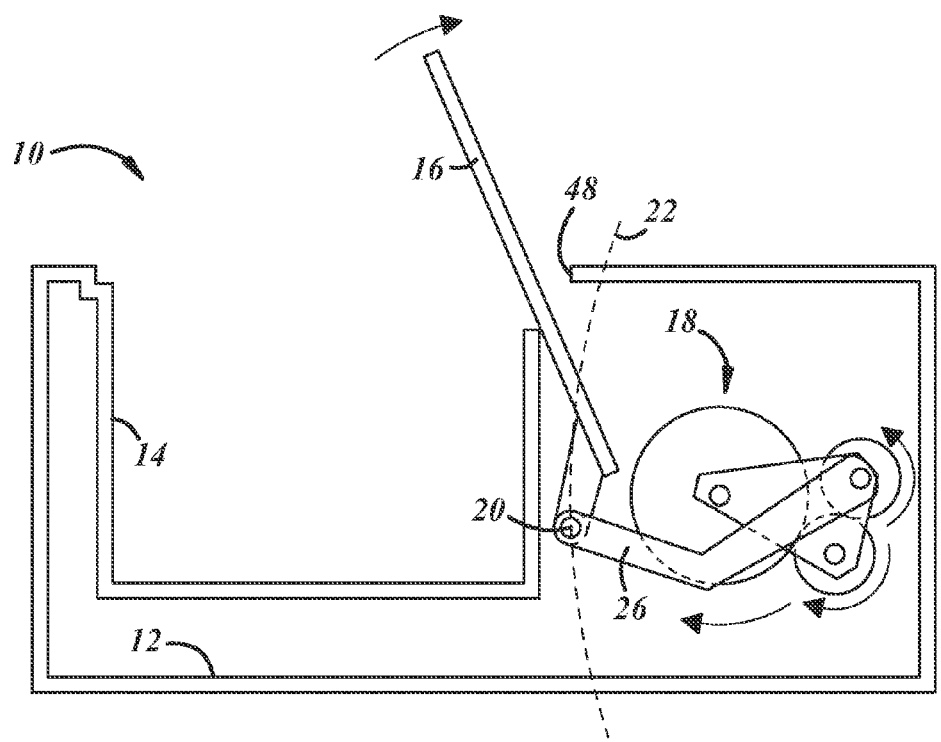
FIG. 3 is the side view of FIG. 1, showing the panel further rotated about the pivot point with respect to FIG. 1.
Figure 4:
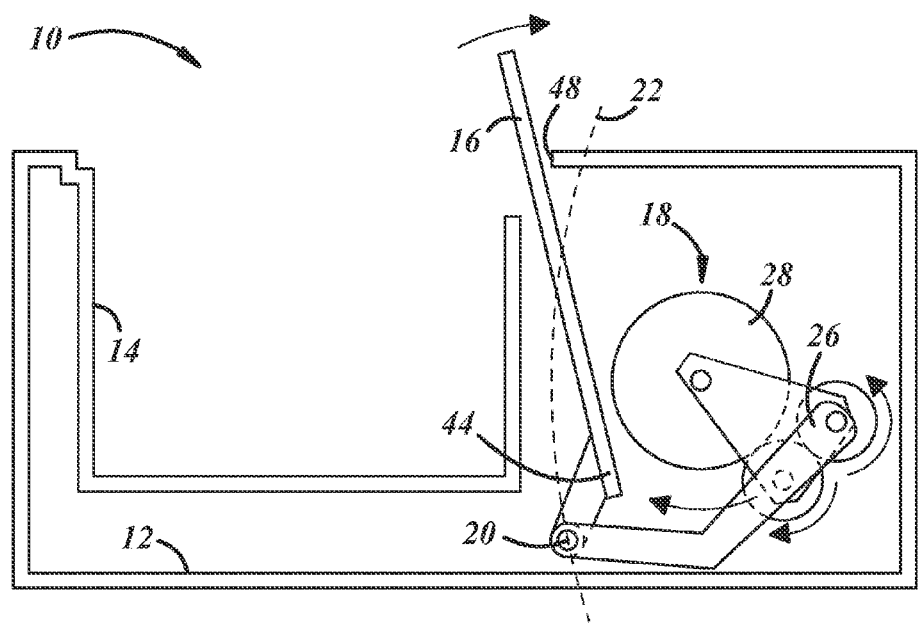
FIG. 4 is the side view of FIG. 1, showing the panel in a stowed position.

Illustrative movement of panel 16 from the closed position of FIG. 1 to the stowed position is shown in FIGS. 2-4, along with corresponding changes in the relative positions of the components of the movement mechanism 18. The panel 16 has opposite first and second ends 42, 44, which can correspond to front and back ends, left and right ends, etc. in any order. The console 10 also includes a top portion 46, which may be constructed integral with the base 12 or may be one or more separately attached piece(s). In the closed position of FIG. 1, the panel 16 is generally aligned with the top portion 46 of the console 10 so that the console has an outer appearance in which the utility area 14 is concealed. The first end 42 of the panel is supported by another portion of the console and may be held in place via a latching mechanism (not shown), such as a "push-push" latch or any other latching mechanism. Though not shown in FIGS. 1-4, the panel may also be supported at other locations when in the closed position such as around the perimeter of the panel.

Referring to FIG. 2, the panel 16 is shown moved away from the closed position and rotated about the pivot point 20 with respect to the closed position. The pivot point 20 is shown moved downward along the line of movement 22, as well. The pivoting movement of the panel 16 about the pivot point 20 may be manually initiated by a vehicle occupant lifting the end 42 of the panel 16. With the particular line of movement 22 shown in FIGS. 1-4, the pivot point 20 moves in a direction horizontally toward the utility area 14 as it begins to move along the line of movement and away from the closed position, and the end 44 of the panel can be inserted through a slot or opening 48 formed along the top portion 46 of the console. The components that surround and define opening 48 can help restrict movement of portions of the panel 16 away from the pivot point 20, which are otherwise free to rotate about the pivot point, as the panel is moved between the closed position and the stowed position. Movement of the pivot point 20 downward along the line of movement 22 corresponds with rotation of the pivot arm 26 and the second planet gear 32 about the center 38 of the second planet gear, shown counter-clockwise in FIG. 2. The first planet gear 30 is thus rotated in the opposite direction about its center 36, causing both planet gear centers 36, 38 and the carrier 40 to rotate about the center 34 of the sun gear 28. With manual operation as described, the second planet gear 32 is the driving gear, but the mechanism 18 could be driven from some other gear in the gear set. For example, an electric motor could turn the first planet gear 30 about its center 36 in the clockwise direction, resulting in corresponding movement of the pivot point 20 along the line of movement 22.

FIG. 3 shows the panel 16 further rotated about pivot point 20, with the pivot point moved farther downward along the line of movement 22. The panel 16 is in a more vertical position than in the previous figures, due to its movement being restricted by the opening 48. FIG. 4 shows the panel 16 in the stowed position, further rotated about the pivot point 20, with the pivot point located as low in the console 10 as the relative component sizes will allow, with the pivot arm 26 reaching the base 12 in this case. In this position, the second end 44 of the panel 16 is concealed from view, at least when viewed from above the console 10. When the panel 16 is in the stowed position, the pivot point 20 is located at a position lower in the console 10 that when the panel is in the closed position. As is apparent from the figures, this type of configuration allows for a relatively large amount of vertical movement of the panel 16 with a relatively small amount of vertical movement of the movement mechanism components. The particular example shown in FIGS. 1-4 is not necessarily optimized for packaging purposes, but it demonstrates the potential for use of smaller components. For example, only a small portion of the perimeter of the sun gear 28 comes into contact with another gear in this example. Thus a small portion or segment of a full gear could be used to achieve relatively large amounts of panel movement.

Figure 5:
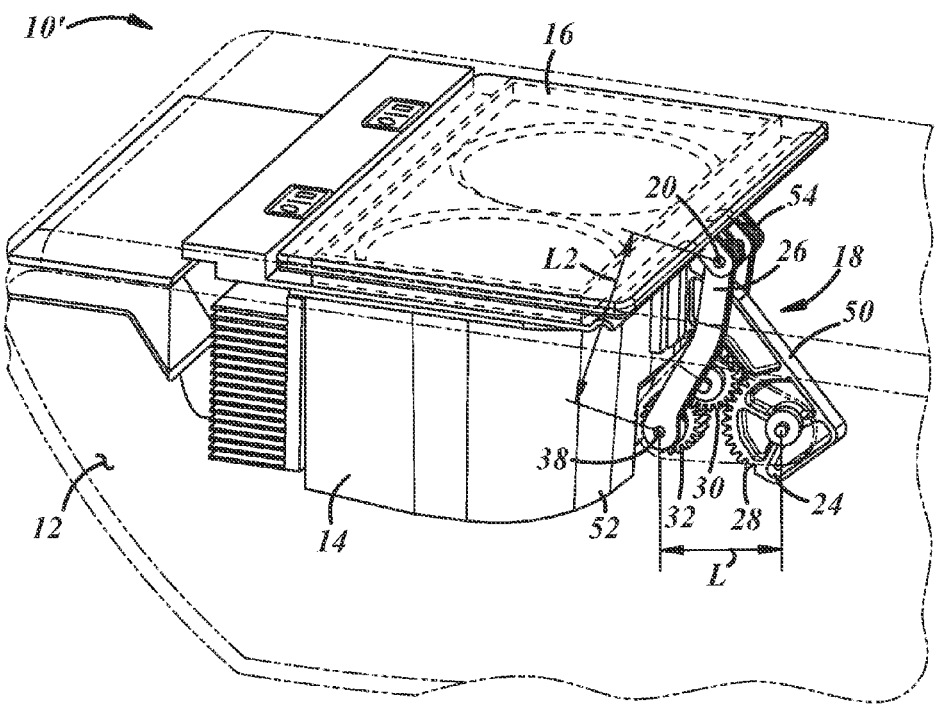
FIG. 5 is a perspective view of another embodiment of a vehicle console showing a panel in a closed position and a movement mechanism coupled with the panel at a pivot point.
Figure 6:
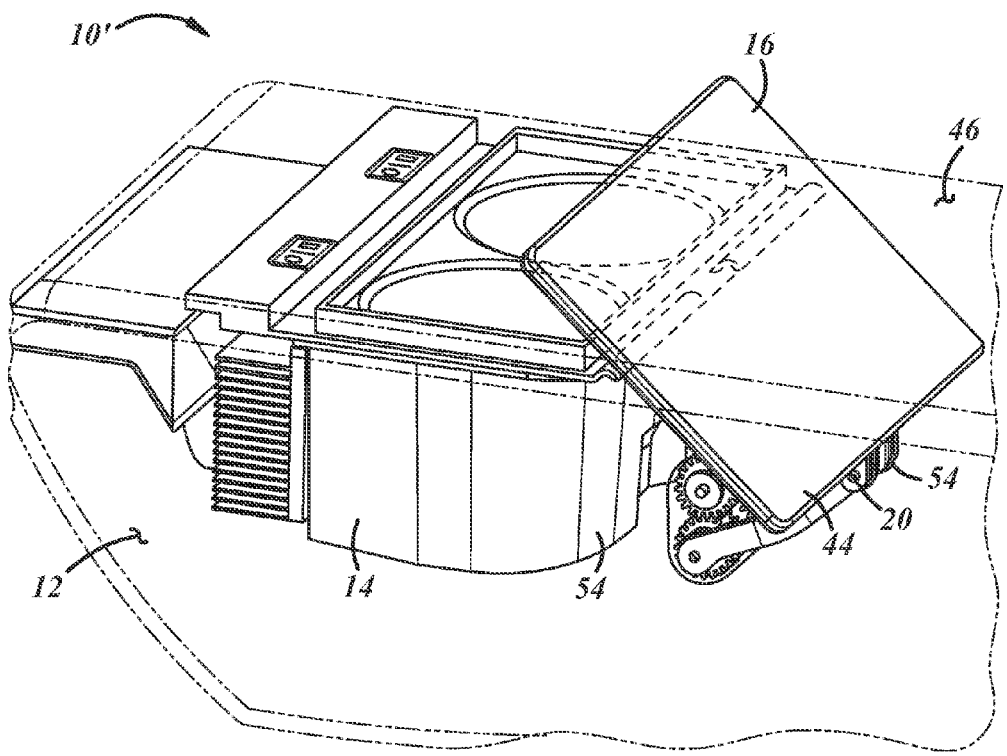
FIG. 6 is the perspective view of FIG. 5, showing the panel moved away from the closed position and toward a stowed position.

FIGS. 5-7 illustrate another embodiment of a vehicle console 10'. In this example, the utility area 14 includes a cup holder supported by the base 12 (shown in phantom). FIG. 5 shows the panel 16 in the closed position over the cup holder 14. The illustrated movement mechanism 18 includes a planetary gear set 24 similar to that of FIGS. 1-4, except the planet gears 30, 32 are located on the opposite side of the sun gear 28, between the sun gear and the utility area 14. In this example, the sun gear 28 is only a portion of a fully round gear and is made as a single piece with a mounting bracket 50, shown attached to a housing 52 of the utility area 14. As with the embodiment shown in FIGS. 1-4, the effective length L2 of the pivot arm 26 is greater that the effective diameter of the sun gear 28. Thus, where the effective diameters of the planet gears 30, 32 are one half the effective diameter of the sun gear 28; the distance L is equal to the effective diameter of the sun gear; and the pivot arm 26 rotates together with the second planet gear 32 about its center 38, movement of the pivot point 20 is along an elliptical path. A smaller elliptical path for pivot point 20 may be obtained by setting the effective length L2 of the pivot arm less than the effective diameter of the sun gear 28, where these other conditions are met. The particular embodiment of FIG. 5 also includes torsion springs 54 at the pivot point 20 to bias the panel 16 against the utility area 14 when in the closed position.

FIG. 6 shows the panel 16 moved away from the closed position and moving toward the stowed position of FIG. 7, where much of the panel 16, including the second end 44, is concealed beneath the top portion 46 of the console 10. The springs 54 bias the panel 16 against the housing 52 as it moves between the closed position and the stowed position and while the panel is in the closed position.

FIGS. 8-10 schematically illustrate another embodiment of a vehicle console 10″. In this example, the line of movement 22 is rectilinear and is oriented vertically, passing through the center 34 of the sun gear 28. The illustrated gear set 24 is a planetary gear set similar to those shown in the previous figures. In this case, however, the pivot arm 26 has an effective length L2 equal to the effective diameter of the sun gear 28. This results in a straight line of movement 22 when the effective diameters of the planet gears 30, 32 are one half the effective diameter of the sun gear 28, the distance L is equal to the effective diameter of the sun gear, and the pivot arm 26 rotates together with the second planet gear 32 about its center 38. This particular combination of relationships among gear and pivot arm sizes and spacing where the line of movement 22 along a straight line passing through the center 34 of the sun gear 28 may also be referred to as a Cardan mechanism. Corresponding movement of the panel 16 as the pivot point 20 moves along the rectilinear path 22 is illustrated in FIGS. 8-10. FIG. 8 shows the panel 16 in the closed position over utility area 14, FIG. 9 shows the panel in a position between the closed position and the stowed position, and FIG. 10 shows the panel in the stowed position. The total vertical travel of the pivot point 20 in this example is four times the effective diameter of the sun gear 28. In the earlier-presented examples, where the effective length of the pivot arm is greater than the effective diameter of the sun gear, the total amount of available vertical travel can be even greater than four times the effective diameter of the sun gear. These relatively large amounts of vertical movement for hinged or pivoting console panels that are stowable within the console typically require a combination of a pivot attachment and sliding or slotted components, which can bind or show wear over time. The geared movement mechanisms described here can provide similar movement without the need for sliding components.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle console, comprising:
a base;
a utility area supported by the base;
a panel being movable to provide access to the utility area and being rotatable about a pivot point; and
a movement mechanism having a planetary gear set and a pivot arm that couples the panel with the planetary gear set at the pivot point, wherein the movement mechanism confines movement of the pivot point along a desired path during panel movement, and cooperative movement of the planetary gear set and the pivot arm defines the shape of the path;
wherein the planetary gear set includes a sun gear and a planet gear, the pivot arm is pivotally attached to the panel at the pivot point, and the pivot arm is attached to the planetary gear set so that the pivot arm rotates together with the planet gear about the center of the planet gear; and
wherein the distance between the pivot point and the center of the planet gear is greater than or equal to an effective diameter of the sun gear.

2. A vehicle console as defined in claim 1, wherein the planet gear is a first planet gear in operational contact with the sun gear, and the planetary gear set further comprises:
a second planet gear in operational contact with the first planet gear.

3. A vehicle console as defined in claim 2, wherein the distance between the center of the sun gear and the center of the second planet gear is the same as an effective diameter of the sun gear.

4. A vehicle console as defined in claim 1, wherein the shape of the path is curvilinear during the entire range of panel movement between a closed position and a stowed position.

5. A vehicle console as defined in claim 4, wherein the shape of the path is elliptical during the entire range of panel movement between a closed position and a stowed position.

6. A vehicle console as defined in claim 1, the shape of the path is rectilinear during the entire range of panel movement between a closed position and a stowed position.

7. A vehicle console, comprising:
a base;
a utility area supported by the base;
a panel that is movable from a closed position to a stowed position to provide access to the utility area; and
a movement mechanism pivotally coupled with the panel at a pivot point so that the panel rotates about the pivot point and the pivot point moves in a downward direction when the panel is moved from the closed position to the stowed position;
wherein the movement mechanism comprises:
a sun gear;
a first planet gear in operational contact with the sun gear, an effective diameter of the first planet gear being one half an effective diameter of the sun gear;
a second planet gear in operational contact with the first planet gear, an effective diameter of the second planet gear being one half the effective diameter of the sun gear;

a carrier, wherein each gear has a center and each gear center is coupled with the carrier so that distances between respective gear centers is constant, the distance between the center of the sun gear and the center of the second planet gear being the same as the effective diameter of the sun gear; and a pivot arm pivotally attached to the panel at the pivot point at one end and attached at the center of the second planet gear at another end so that the pivot arm rotates together with the second planet gear about the center of the second planet gear.

8. A vehicle console as defined in claim 7, wherein the panel includes an end that is visible when the panel is in the closed position and said end is concealed from view when the panel is moved to the stowed position.

9. A vehicle console as defined in claim 7, wherein the movement mechanism is configured to confine movement of the pivot point along a curvilinear or rectilinear path during the entire range of panel movement between the closed position and the stowed position.

10. A vehicle console as defined in claim 7, wherein the distance between the pivot point and the center of the second planet gear is greater than or equal to the effective diameter of the sun gear.

11. A vehicle console, comprising:
a base;
a utility area supported by the base;
a panel being movable to provide access to the utility area and being rotatable about a pivot point; and
a movement mechanism having a planetary gear set and a pivot arm that couples the panel with the planetary gear set at the pivot point, wherein the movement mechanism confines movement of the pivot point along a desired path during panel movement, and cooperative movement of the planetary gear set and the pivot arm defines the shape of the path; and wherein the planetary gear set includes a sun gear having an effective diameter and a planet gear having an effective diameter that is one half of the effective diameter of the sun gear.

12. A vehicle console as defined in claim 11, wherein the planet gear is a first planet gear, and the planetary gear set further comprises a second planet gear in operational contact with the first planet gear.

13. A vehicle console as defined in claim 12, wherein the distance between the center of the sun gear and the center of the second planet gear is the same as the effective diameter of the sun gear.

14. A vehicle console as defined in claim 11, wherein the pivot arm is pivotally attached to the panel at the pivot point, and the pivot arm is attached to the planetary gear set so that the pivot arm rotates together with the planet gear about the center of the planet gear.

15. A vehicle console as defined in claim 11, wherein the distance between the pivot point and the center of the planet gear is greater than or equal to the effective diameter of the sun gear.

16. A vehicle console as defined in claim 11, wherein the shape of the path is curvilinear.

17. A vehicle console as defined in claim 11, wherein the shape of the path is rectilinear.

* * * * *